United States Patent [19]
Schlaepfer
[11] 4,415,623
[45] Nov. 15, 1983

[54] DECORATION OF SHEET MATERIAL

[75] Inventor: Robert J. Schlaepfer, St. Gallen, Switzerland

[73] Assignee: Jacob Schlaepfer & Co. AG, St. Gallen, Switzerland

[21] Appl. No.: 191,741

[22] Filed: Sep. 29, 1980

Related U.S. Application Data

[63] Continuation of Ser. No. 916,176, Jun. 16, 1978, abandoned, which is a continuation-in-part of Ser. No. 866,114, Dec. 30, 1977, abandoned, which is a continuation of Ser. No. 614,709, Sep. 18, 1975, Pat. No. 4,071,387.

[30] Foreign Application Priority Data

Sep. 19, 1974 [GB] United Kingdom ............... 40872/74
Apr. 15, 1975 [GB] United Kingdom ............... 15444/75

[51] Int. Cl.$^3$ ......................... B32B 3/18; B41M 3/12; B44C 1/16

[52] U.S. Cl. .................................... 428/200; 156/230; 156/239; 156/240; 156/249; 427/146; 427/148; 427/203; 428/206; 428/207; 428/208; 428/240; 428/241; 428/323; 428/347; 428/349; 428/913; 428/914

[58] Field of Search ............... 156/230, 234, 240, 239, 156/249; 427/147, 148, 146, 197, 198, 203, 205; 428/144, 148, 150, 196, 200, 202, 206, 207, 208, 323, 325, 331, 347-349, 913, 914, 206, 240, 241

[56] References Cited

U.S. PATENT DOCUMENTS 3,089,800 5/1963 Colfer et al. .......................... 428/40
3,463,692 8/1969 Brunner .............................. 156/306
3,567,567 2/1971 Sherrill ................................. 161/67
3,961,121 6/1976 Warsager ............................ 428/200

*Primary Examiner*—Bruce H. Hess
*Attorney, Agent, or Firm*—Edwin E. Greigg

[57] ABSTRACT

The present invention relates to the decoration of sheet materials and has particular reference to the application of decorative stones either alone or in combination with embroidery patterns to sheet materials.

4 Claims, 5 Drawing Figures

DECORATION OF SHEET MATERIAL

This is a continuation of application Ser. No. 916,176 filed June 16, 1978 (now abandoned), which in turn is a continuation-in-part of application Ser. No. 866,144, filed Dec. 30, 1977 (now abandoned), which in turn is a continuation of application Ser. No. 614,709, filed Sept. 18, 1975 (now U.S. Pat. No. 4,071,387).

BACKGROUND OF THE INVENTION

At the present time the application of such decorative stones to sheet materials and/or fabric is relatively expensive. Production costs are increased by the fact that in many cases there is a customer demand for fabrics which are not decorated all over their area but only in certain places. The application of decorative articles to specific areas is very expensive if the decorative cover factor, that is to say, the ratio between the total area of the sheet material and the decorated areas, is low due to the fact that the machines applying the decorative articles operate with low efficiency when fabrics or other sheet material have to be positioned on the machine and then taken off after a relatively small number of decorating operations. In general, the positioning and removal of the sheet materials on such machines is largely done by hand and, in consequence, a large number of hand manipulations for a small number of decorative operations renders the decoration relatively costly.

When making up decorative sheet material into garments and the like, the cutting pattern has to be very carefully laid out in view of the fact that in the made-up garment, the decorated areas have to be correctly positioned. The need for matching the cut parts of the garment to be made as regards the position of the decorations will produce much more waste than in the case of undecorated fabrics. In garment making, during cutting it is usual to do the cutting simultaneously on a relatively large number of layers of material stacked one on top of the other. This technique is very difficult in the case of locally embroidered fabrics due to the varying thicknesses of the fabrics carrying the embroidered portions in the stack.

OBJECT AND SUMMARY OF THE INVENTION

According to the present invention therefor, there is provided a decorative article for application to a sheet material comprising:

a rigid decorative shape selected from the group consisting of stones, metal shapes and ingots and rock samples;

a yarn layer of a heat activatable adhesive applied to a first surface of said shape; and a heat stable carrier sheet adhesively releasably adhered to a second surface of said shape;

said article being adapted to be positioned with said first surface juxtaposed a sheet material and upon the application of heat and pressure to said carrier sheet to activate said adhesive to produce bonding of the article to said sheet material.

The carrier sheet forming a backing layer for lamination with the thermally decomposable substrate of the embroidered decoration may be applied by means of a pressure-sensitive adhesive, preferably initially applied to the sheet itself.

The minimum decomposition temperature of the heat degradable substrate may be 100° C. and the minimum temperature at which the low-melting thermoplastic embroidering yarns beçome tacky may be 70° C. The fusing temperature at which the adhesive layer is activated is preferably at least 100° C. and at least 20° C. below the softening point of any thermoplastic material present in the temporary laminate excluding the thermoplastic threads of the substrate itself.

The melting points of any thermoplastic material in the temporary laminate or carrier sheet may be higher than 180° C. and preferably greater than 220° C.

The invention also includes a method of applying decorative articles to sheet materials, which method comprises:

forming with or applying to a surface of an article a heat activated adhesive;

laminating said article with a support sheet which is stable at temperature of activation of said adhesive, which lamination is carried out on a surface of said article removed from said adhesive layer;

positioning said laminate on a sheet material to be decorated;

applying heat and pressure to activate said adhesive to cause adhesion between the article and sheet material; and thereafter stripping the support sheet constituting the laminate from said decorative article.

The invention will be better understood as well as further objects and advantages thereof become more apparent from the ensuing detailed description of the preferred embodiments taken in conjunction with the drawings.

DESCRIPTION OF THE PREFERRED EMBODIMENTS

As stated above, the heat-activated adhesive is preferably a thermoplastic layer which softens on the application of heat. The heat-activated adhesive may be a low-melting thermoplastic yarn which becomes tacky at a temperature of approximately 70° or more. Typical heat-activated adhesives are nylon 11, and polyethylene. The carrier sheet may be non-woven fabric formed of regenerated cellulose fibers bonded together by non-thermoplastic binders, such as a cotton backed plastic film having a melting point greater than 200° C.

The decorative article itself may be an embroidery pattern, which has a layer of heat-activated adhesive. The carrier sheet may be bonded to the articles per se by means of a pressure-sensitive adhesive which may comprise an aqueous paste of 800 parts of butyl acrylate and 600 parts of carboxy-methyl-cellulose.

For the purposes of the present specification, the term "heat activated adhesive" is intended to include materials which soften and fuse with the application of heat in order to provide a bond between the decorative article and a fabric or sheet layer to which it is applied.

The laminate once formed may be cut into smaller pieces for positioning on the sheet material prior to heat treatment if desired.

In the initial step the glass particles 4*a* are applied to a backing stencil 1*a* and each glass particle carries a small portion of a thermoplastic coating on the base thereof. A carrier sheet 2 is provided with an adhesive layer on the face thereof and is applied to the face containing the glass particles 4*b*.

The particles then adhere in a predetermined pattern and are removed from backing stencil 1*a* to leave the carrier sheet 2 supporting and carrying the glass particles 4 in their pattern disposition.

Figure 1:
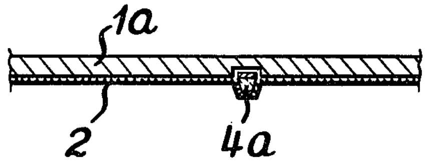
FIGS. 1 and 2 are sections through stencils for positioning the glass particles and incorporating a carrier sheet.
Figure 2:
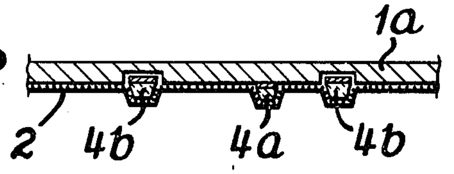
Figure 3:
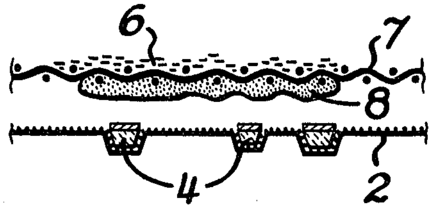
FIG. 3 illustrates the application of the carrier sheet to the degradable layer carrying the embroidery motifs.
Figure 4:
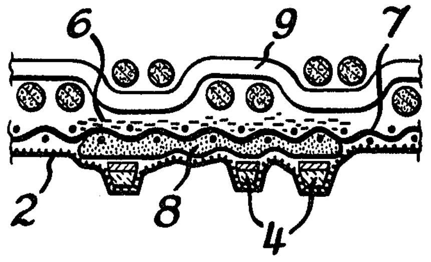
FIG. 4 illustrates the application of the entire pattern or design to a fabric to be decorated.
Figure 5:
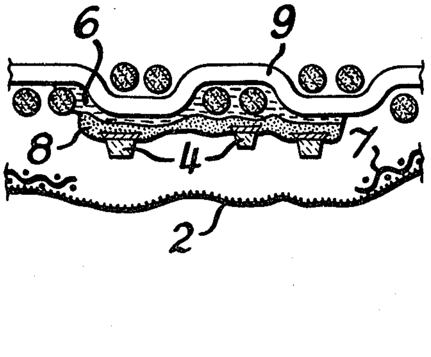
FIG. 5 illustrates the decoration applied to the fabric to be decorated.

The same time a decorative embroidered pattern 8 is applied to a thermo-degradable rayon fabric 7 having a backing of thermoplastic polyethylene threads 6 which are heat fusible. The embroidery pattern 8 is positioned with respect to a fabric material 9 to be decorated with the thermoplastic threads 6 juxtaposed between the fabric 7 and the fabric material 9. The carrying sheet 2 supporting and carrying the glass particles 4 is then positioned over the embroidery pattern 8 and heat and pressure are then applied. The application of heat results in thermal degradation of the fabric 7 and the deformation of the thermoplastic threads 6 to secure the embroidery pattern 8 to the fabric material 9 and at the same time to cause the thermoplastic coating on the base of each glass particle to be fused into and distributed within the embroidery pattern 8 to retain the glass particles 4 in their decorative disposition. Removal of the carrier sheet 2 results in removal of the exposed and degraded fabric 7 as shown in FIG. 5.

The invention further enables designs to be applied to garments made up such as dresses, coats, curtains and the like.

The temporary laminate may, with or without precutting, be stacked, stored, shipped or retailed without difficulty and without fear of shifting or distortion of any embroidery designs, which may be included with the design.

Furthermore, fusing may be carried out either in a press such as those commonly used by garment manufacturers, or by the use of a household iron.

Following is a description by way of example only of methods of carrying the invention into effect.

EXAMPLE I

Small decorative glass particles were coated on one surface with a polyethylene coating to serve as a fusible adhesive. The particles, which had the shape of cut diamonds and consisted of glass, were positioned for assembling mechanically on stencils in a pattern, the base of the diamond shape being supported by the stencil and the facet-like topside facing upwards.

A carrier fabric was then prepared comprising a non-woven fabric made from regenerated cellulosic fibers bonded together by a non-thermoplastic binder and then subjected to a caustic treatment. This non-woven carrier fabric was then coated with a pressure-sensitive adhesive.

The adhesive was formed of an aqueous paste containing 800 parts of butyl acrylate and 600 parts of carboxymethyl-cellulose as a thickening agent. The pressure-sensitive adhesive was applied to a surface of the carrier fabric at a rate of 60 grams per square meter and was sufficient to provide bond strength between the cellulosic fibers and the embroidery pattern.

The sheet thus prepared was then pressed against the stencils in a continuous calender press equipped with a hard roll and a very soft roll (neoprene rubber) Shore Hardness 10. The facet-like top side of the decorating particle becomes embedded in and secured to the carrier material, the base of the decorating particles becomes disengaged from the stencil, and the carrier material after leaving the calender press was parted from the stencils.

The carrier fabric carrying the decorating particles was then laid onto a wool dress fabric. Both fabrics were passed through a semi-continuous flat-bed press, the temperature of the heated plate was 160° C., the pressing time was 20 seconds, and the pressure was 50 to 100 grams per square centimeter.

Under the influence of heat and pressure, the polyethylene coating at the base of the diamond shaped decorating particles acted as fusible adhesive between the wool fabric and the particles were bonded firmly thereto.

After cooling, the carrier sheet material was then peeled from the decorative particle, leaving the particles firmly secured to the wool fabric. The bond strength between the carrier sheet materials and the decorative particles was substantially lower than the strength of the bond between the wool fabric and the decorative particles produced by the fusion step.

EXAMPLES II and III

Additional tests were carried out as set out in the following tables.

| | Examples | |
|---|---|---|
| | II | III |
| (1) Base Fabric (thermo-degradable) | glass particles * | as Example I |
| (2) Designing Method (pattern) | positioning of glass particles on carrier sheet in pattern | as Example I |
| (3) Thermoplastic Thread (fusible adhesive) | polyethylene on base of glass particles | as Example I |
| (4) Embroidery Thread | — | as Example I |
| (5) Carrier Sheet Material | cotton interlining fabric, napped on one side | polyester film coated with acrylic adhesive |
| (6) Adhesive used | as Example I | 72% acrylic copolymer 14% paraffine emulsion 13,5% Collacral VL300 90 g/m2 applied (wet) |
| (7) Joining of Embroided Base Fabric to carrier Sheet Material | roller press, upper roller, 10 shore hardness (neoprene sponge | roller press as Example II |

-continued

| | Examples II | Examples III |
|---|---|---|
| | rubber), lower roller very hard | |
| (8) Material to be Decorated | wool gabadine | cotton corduroy |
| (9) Transfer of Decorative Elements | semi continuous, 160° C. 20 seconds, 100 g/sq.cm | that bed press 160° C. 20 seconds, 50 g/cm2 |
| (10) Removal of Heat Degraded Base Fabric | peeling off of carrier fabric after cooling | peeling off of film after cooling |

EXAMPLES IV and V

| IV | V |
|---|---|
| (1) as Example I | as Example I |
| (2) as Example I | as Example I |
| (3) as Example I | as Example I |
| (4) as Example I | as Example I |
| (5) as Example III | thin cardboard |
| (6) as Example III | as Example III |
| (7) as Example III | calender, cold |
| (8) belt buckle brass | viscose filament fabric, embroidered with triacelate pailletes |
| (9) hand iron 20 seconds/160° C. | semi-continuous flat bed press, 160° C. 20 seconds |
| (10) peeling off of carrier film | peeling off of cardboard after cooling |

EXAMPLE VI

A rayon print cloth was treated with a potentially acidic carbonising agent which decomposes the cellulose if heated to 150° C. or more.

This fabric was embroidered with acrylic yarns, using a bobbin thread of a terpolymer consisting of nylon 6, nylon 66 and nylon 11. The embroidered motifs then were cut out.

Faceted glass particles with polyethylene as heat-sealable adhesive on their bases were positioned by means of stencils in a pattern and fixed on the adhesive side of a transparent carrier sheet, the polyethylene-covered base facing away from the carrier sheet consisting of a laminate of a polyester and cellophane film coated with a pressure-sensitive adhesive on the cellophane side. Glass particles of different size, color and shape thus were arranged like mosaics to form a pattern adhering to the carrier material.

The pre-cut embroidered motifs of step 1 were then pressed onto the carrier sheet holding the glass particles with its particle-covered adhesive side facing the motifs (embroidered fabric described above), on a roller press as in Example II in such a way that the thermoplastic bobbin threads were facing away from the carrier sheet, i.e., remained available for subsequent fusing operations and were not affected by the lamination step.

Since the pre-cut motifs did not cover all areas of the adhesive side of the transparent carrier, the motif-covered side of the laminate was covered with a protective sheet (e.g., polyethylene film) for storage and shipping purposes, i.e., until the motifs were fused to the sheet material to be decorated. This sandwich then was die-cut into pieces comprising clusters of motifs. Instead of cutting this sandwich structure at this stage into the desired pattern size, one can carry out steps 2 and 3 with sheet material having already the appropriate size.

After peeling off the protective film, the laminate was laid on the cotton muslin which had to be decorated, the thermoplastic nylon bobbin threads and the polyethylene coated bases of the glass particles facing the muslin. Fusing of the embroidery motifs and the glass particles to the muslin was effected by pressing on a semi-continuous press for 25 seconds (100 g/sq.cm. pressure), the heat (180° C.) being applied through the cotton muslin. This heat treatment not only fused the embroidery motifs and the glass particles to the cotton muslin, but at the same time destroyed the heat-degradable rayon fabric. The layers were then removed from the press and cooled. The carrier sheet is peeled off, removing at the same time the carbonised rayon fabric by the adhesive.

The patterns then were cut out, leaving about 1 cm. in and outside the embroidered line pattern. The cut part thus produced had the shape of a ring following the contours of a flower.

A transparent carrier sheet consisting of a polyester/-cellophane extrusion film coated with a pressure-sensitive adhesive on the cellophane side was laid on a table, the adhesive side facing up. The pre-cut flower-shaped pieces of the printed cotton fabric and the dyed acrylic fabric from step 1 were alternately placed on the carrier sheet in a pre-determined pattern (polyethylene coated side up), sufficient pressure being applied to effect adhesion. Then the ring-like pre-cut shapes of the heat-degradable embroidered rayon fabrics were placed on or around the edges of matching flower-shaped pieces of the cotton and acrylic fabrics with gentle pressure. For storage and shipping purposes a protective film (polyethylene) was placed on top of the carrier sheet holding the pre-cut pieces before batching this sandwich structure.

The foregoing relates to preferred exemplary embodiments of the invention, it being understood that other embodiments and variants thereof are possible within the spirit and scope of the invention, the latter being defined by the appended claims.

What is claimed is:

1. A decorative article for application to a sheet material comprising:

a rigid decorative shape selected from a group consisting of stones and metal shapes and having at least a first surface and a second surface, a layer of a heat activatable low-melting thermoplastic adhesive applied to said first surface of said shape, and a heat stable carrier sheet of non-heat-pressure sensitive release material adhesively releasably adhered to said second surface of said shape, said carrier sheet including a non-woven fabric of regenerated cellulose fibers bonded together by non-thermoplastic binders having a melting point greater than 200° C., said article being adapted to be positioned with said first surface juxtaposed to said sheet material whereupon application of heat and pressure to said heat stable carrier sheet activates said low-melting thermoplastic adhesive and produces bonding of said article to said sheet material, the carrier sheet being removed after said bonding has occurred thereby maintaining registration of said article.

2. An article as claimed in claim 1 wherein said heat activatable low-melting thermoplastic adhesive softens on an application of heat.

3. An article as claimed in claim 2 wherein said heat activatable low-melting thermoplastic adhesive becomes tacky at a temperature within the range of 70° C. to 180° C.

4. An article as claimed in claim 3 wherein said heat activatable low-melting thermoplastic adhesive is selected from a group essentially consisting of nylon II and polyethylene.

* * * * *